United States Patent
Upham (10) Patent No.: US 11,987,394 B2
(45) Date of Patent: May 21, 2024

(54) MULTI-SPACECRAFT DEPLOYMENT

(71) Applicant: Maxar Space LLC, Westminster, CO (US)

(72) Inventor: Jon Brooks Upham, Longmont, CO (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 17/952,050

(22) Filed: Sep. 23, 2022

(65) Prior Publication Data

US 2024/0101281 A1 Mar. 28, 2024

(51) Int. Cl.
*B64G 1/64* (2006.01)

(52) U.S. Cl.
CPC .............. *B64G 1/641* (2013.01); *B64G 1/643* (2023.08)

(58) Field of Classification Search
CPC ........ B64G 1/641; B64G 1/643; B64G 1/645; B64G 1/32; B64G 1/244; B64G 1/10; B64G 1/1085; B64G 1/222; F16B 1/00; F16B 2200/83
See application file for complete search history.

(56) References Cited

U.S. PATENT DOCUMENTS

| | | | |
|---|---|---|---|
| 9,415,883 B2 | 8/2016 | Holemans et al. | |
| 9,463,882 B1 | 10/2016 | Field et al. | |
| 10,351,268 B2 * | 7/2019 | Estevez | B64G 1/1085 |
| 10,486,837 B2 | 11/2019 | Field et al. | |
| 10,689,132 B2 | 6/2020 | Peterka, III et al. | |
| 10,717,551 B2 | 7/2020 | Estevez et al. | |
| 10,938,288 B2 | 3/2021 | Hsu et al. | |
| 11,444,412 B1 * | 9/2022 | Deppen | H01R 13/533 |
| 2016/0318635 A1 * | 11/2016 | Field | B64G 1/10 |
| 2018/0111707 A1 * | 4/2018 | Poncet | B64G 1/641 |
| 2019/0385774 A1 * | 12/2019 | Denham | H01F 7/0231 |
| 2020/0270001 A1 | 8/2020 | Mansour et al. | |
| 2022/0033111 A1 * | 2/2022 | Welle | B64G 1/64 |
| 2022/0135258 A1 | 5/2022 | Admani et al. | |
| 2023/0108618 A1 * | 4/2023 | Denham | B64G 1/641 |
| | | | 244/173.1 |

FOREIGN PATENT DOCUMENTS

EP 3333086 B1 10/2017

* cited by examiner

*Primary Examiner* — Medhat Badawi
*Assistant Examiner* — Vicente Rodriguez
(74) *Attorney, Agent, or Firm* — Vierra Magen Marcus LLP (57) ABSTRACT

Technology is disclosed herein for deploying stacked spacecraft. When the spacecraft are stacked corresponding z-axis magnetic torque rods of the spacecraft will align with each other along a z-axis. Thus, collectively the stack of spacecraft have one or more sets of magnetic torque rods aligned with the z-axis. Just prior to deploying the spacecraft the one or more sets of magnetic torque rods are operated to hold the stack of spacecraft together. For example, the north magnetic pole of the magnetic torque rod in one spacecraft may face the south magnetic pole of the magnetic torque rod in an adjacent spacecraft. To deploy the top spacecraft, the polarity of the z-axis magnetic torque rod(s) in the top spacecraft is/are reversed. After the spacecraft is clear of the stack the magnetic torque rod(s) in the deployed spacecraft may be de-activated. Then another spacecraft may be deployed in a similar manner.

20 Claims, 10 Drawing Sheets

MULTI-SPACECRAFT DEPLOYMENT

BACKGROUND

The cost to launch and deploy multiple spacecraft such as satellites is extraordinarily expensive. The cost per satellite can be reduced by launching multiple satellites with one launch vehicle. After the launch vehicle is at a suitable altitude the spacecraft may be separately deployed from the launch vehicle. However, there are technical challenges involved with launching multiple satellites with one launch vehicle.

Shortly after the spacecraft are deployed from the launch vehicle the spacecraft could contact each other, thereby damaging one or more spacecraft. The spacecraft can be made more impact resistant to minimize damage from this contact. However, making the spacecraft more impact resistant could add to the mass and/or cost.

The equipment used to deploy the spacecraft from the launch vehicle can add to the mass. Any additional mass adds considerably to the fuel cost. Thus, it is desirable to reduce the mass of the payload of the launch vehicle.

DETAILED DESCRIPTION

Technology is disclosed herein for deploying (or dispensing) stacked spacecraft from a launch vehicle. In one embodiment, each spacecraft has at least one magnetic torque rod aligned in a z-axis (or yaw-axis). In one embodiment, each spacecraft has two magnetic torque rods that are aligned in the z-axis. When the spacecraft are stacked corresponding z-axis magnetic torque rods of the spacecraft will align with each other along the z-axis. Thus, collectively the stack of spacecraft have one or more sets of magnetic torque rods aligned with the z-axis. Just prior to deploying the spacecraft the one or more sets of magnetic torque rods are operated to hold the stack of spacecraft together. For example, the north magnetic pole of the magnetic torque rod in one spacecraft may face the south magnetic pole of the magnetic torque rod in an adjacent spacecraft to hold the stack of spacecraft together. To deploy the top spacecraft, the polarity of the one or more z-axis magnetic torque rods in the top spacecraft is/are reversed. After the spacecraft is clear of the stack the magnetic torque rod(s) in the deployed spacecraft may be de-activated. Then another spacecraft may be deployed in a similar manner. Therefore, multiple spacecraft may be deployed while preventing or at least reducing contact between the spacecraft.

Figure 1:
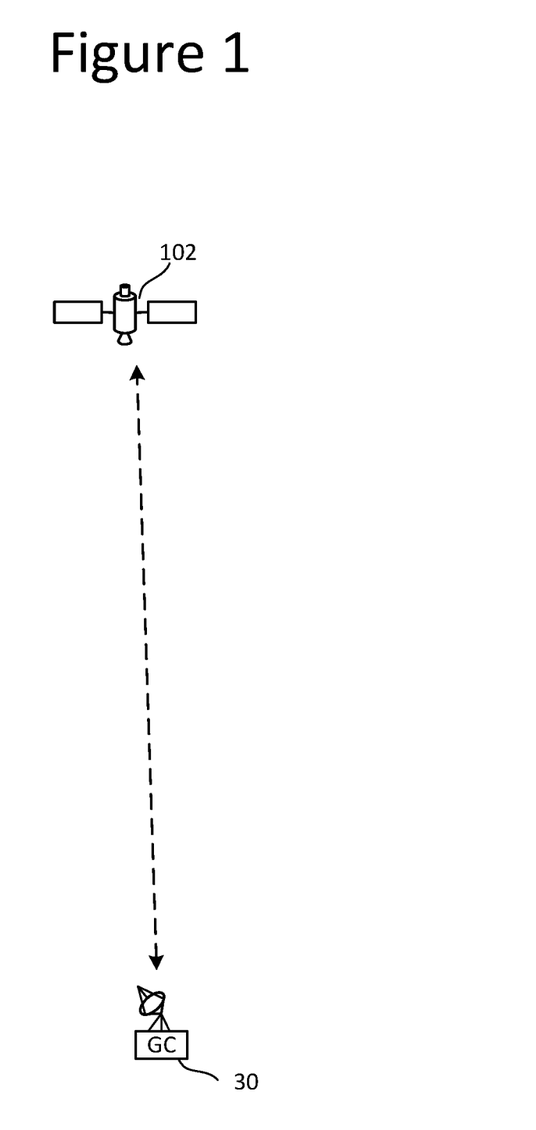
FIG. 1 is a block diagram of a spacecraft system.

FIG. 1 is a block diagram of an example spacecraft system. The system of FIG. 1 includes spacecraft 102 and ground control terminal 30. In one embodiment, spacecraft 102 is a satellite; however, spacecraft 102 can be other types of spacecraft (e.g., shuttle, space station, inter-planet traveling craft, rocket, etc.). Spacecraft 102 can be in a geostationary or non-geostationary orbital location. In one embodiment, spacecraft 102 may be located, for example, at a Low Earth Orbit (LEO). Technology disclosed herein may be used for dispensing (or deploying) the spacecraft 102 using magnetic torque rods. Ground control terminal 30 is used to monitor and control operations of spacecraft 102. Spacecraft can vary greatly in size, structure, usage, and power requirements. In some embodiments, the spacecraft 102 is not used as a communication satellite. In some embodiments, the spacecraft 102 has other payloads such as for an optical satellite.

Figure 2:
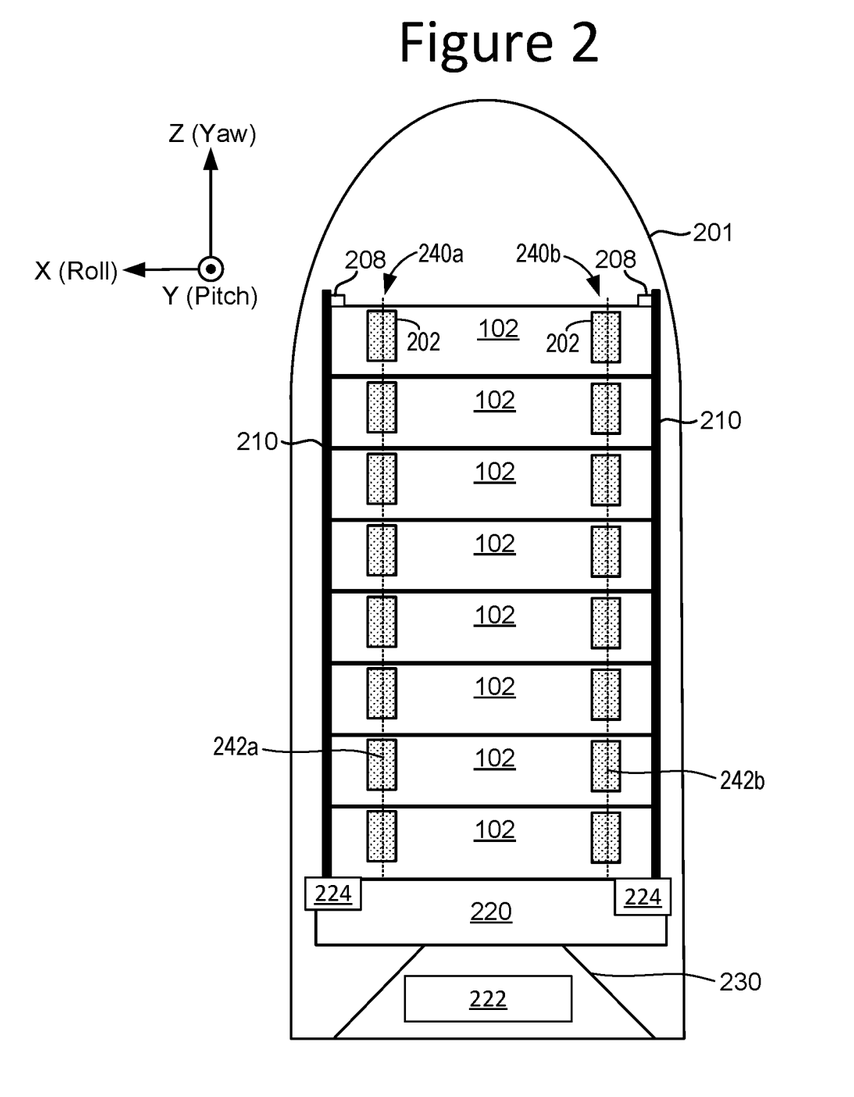
FIG. 2 an embodiment of launch configurations for a spacecraft within a fairing of a launch vehicle.

FIG. 2 illustrates an embodiment of a stack of spacecraft 102 in a launch configuration within a fairing 201 of a launch vehicle (launch vehicle not illustrated). The configuration in FIG. 2 may be referred to as a launch configuration. The launch configuration includes a launch adaptor 220 that is mechanically coupled, in the launch configuration, with a primary payload adaptor 230 that may be part of an upper stage (not illustrated) of the launch vehicle. Together the launch adaptor 220 and the primary payload adaptor 230 may be referred to herein as a launch vehicle adaptor. In general, the adaptors 220, 230 are used to help carry the load from the multiple spacecraft 102 to the launch vehicle. The adaptors 220, 230 may be formed from a lightweight material such as aluminum, titanium, or graphite.

The stack of spacecraft 102 are held together in the launch configuration by a tie-down and release mechanism. In an embodiment, the tie-down and release mechanism includes a number of tension rods 210, tie down clamps 208, and release mechanisms 224. The tie-down and release mechanism secures the stack of spacecraft 102 to the launch adaptor 220. The tension rods 210 could be formed from, for example, aluminum, titanium or graphite. Prior to deploying the spacecraft 102, release mechanisms 224 moves the tension rods 210 to a deployment configuration to allow the spacecraft 102 to be deployed. While FIG. 2 depicts two tension rods 210 there could be more than two tension rods. In one embodiment, there are four tension rods 210. The tie-down and release mechanism depicted in FIG. 2 is one example; however, other types of tie-down and release mechanisms may be used. For example, one type of tie-down and release mechanism may use cables rather than tension rods. Note that tie-down and release mechanisms (in the context of spacecraft) are sometimes referred to as hold down and release mechanisms.

Each spacecraft 102 has magnetic torque rods. The magnetic torque rods 202 depicted in FIG. 2 are z-axis magnetic torque rods (e.g., aligned with the z-axis). Each spacecraft 102 will also typically have an x-axis magnetic torque rod and a y-axis magnetic torque rod, but those are not depicted in FIG. 2. The magnetic torque rods may be anchored to the respective spacecraft 102. The magnetic torque rods are capable of being activated and inactivated. For example, a magnetic torque rod may contain one or more electromagnets. The magnetic torque rods are typically not activated when in the launch configuration. When activated a magnetic torque rod will have a north magnetic pole and a south magnetic pole. The relative orientations of the north magnetic pole and the south magnetic pole are controllable.

The magnetic torque rods 202 may be used for attitude control, as well as spacecraft stabilization. When used for attitude control and/or stabilization, the magnetic torque rods 202 may be used in combination with a reaction wheel and/or by interacting with the Earth's magnetic field. However, when used for deployment of spacecraft 102 as described herein, the magnetic torque rods 202 are not required to be used in combination with reaction wheels and are not required to interact with the Earth's magnetic field to achieve deployment of the spacecraft 102. In one embodiment, each magnetic torque rod 202 has one or more electromagnetic coils. When activated (e.g., powered) a magnetic torque rod 202 may create a magnetic dipole (e.g., north magnetic pole and south magnetic pole). The magnetic field may be controlled by controlling the current that flows through the electromagnetic coils. A wide variety of magnetic torque rods 202 may be used including, but not limited to, air core magnetorquers, embedded coils, and torquerods. In an embodiment, each spacecraft has a control circuit that is capable of controlling the magnetic torque rods 202. The control circuit may comprise hardware and/or software. The control circuit could include one or more of a processor (e.g., micro-processor), PGA (Programmable Gate Array, FPGA (Field Programmable Gate Array), ASIC (Application Specific Integrated Circuit), integrated circuit or other type of circuit.

In an embodiment, a control circuit 222 in the primary payload adaptor 230 controls tie-down and release mechanism. Optionally, the control circuit 222 in the primary payload adaptor 230 may send signals to a control circuit in a spacecraft 102 to control the magnetic torque rods 202 during deployment. Optionally, the control circuit 222 in the primary payload adaptor 230 may directly control the magnetic torque rods 202 during deployment. The control circuit 222 may comprise hardware and/or software. The control circuit 222 could include one or more of a processor (e.g., micro-processor), PGA (Programmable Gate Array, FPGA (Field Programmable Gate Array), ASIC (Application Specific Integrated Circuit), integrated circuit or other type of circuit.

Figure 3:
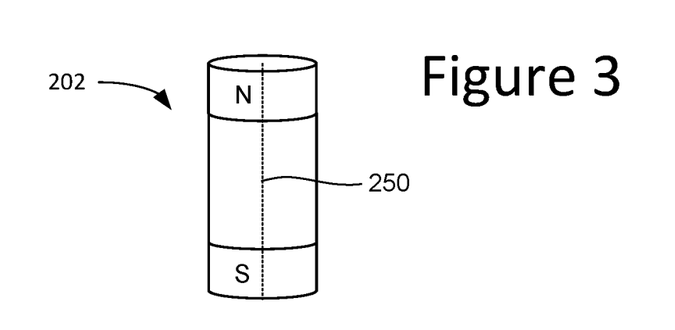
FIG. 3 depicts an example of a magnetic torque rod that may be used in an embodiment of spacecraft deployment.

FIG. 3 depicts an example of a magnetic torque rod 202. The north magnetic pole (N) and the south magnetic pole (S) are shown. As noted above, the magnetic polarity is reversible. The axis 250 between the north magnetic pole (N) and the south magnetic pole (S) is referred to herein as the magnetic axis. The magnetic axis may coincide with the longest axis of the magnetic torque rod 202, which is referred to as the longitudinal axis. Herein, the term magnetic axis will be used to refer to axis 250 whether or not the magnetic torque rod 202 is presently powered on. Referring back to FIG. 2, the stack of spacecraft 102 has a first set 240a of magnetic torque rods having one z-axis magnetic torque rod 202 in each spacecraft 102 and a second set 240b of magnetic torque rods having one z-axis magnetic torque rod 202 in each spacecraft 102. For each set 240a, 240b of magnetic torque rods, the magnetic axes of the magnets are aligned with each other along the z-axis. Dashed line 242a (see FIG. 2) shows the z-axis alignment of the first set 240a of magnetic torque rods along the magnetic axes. Dashed line 242b (see FIG. 2) shows the z-axis alignment of the second set 240b of magnetic torque rods along the magnetic axes. Note that in other embodiments the stack of spacecraft 102 may have more or fewer than two sets 240a, 240b of magnetic torque rods aligned with the z-axis.

Figure 4A:
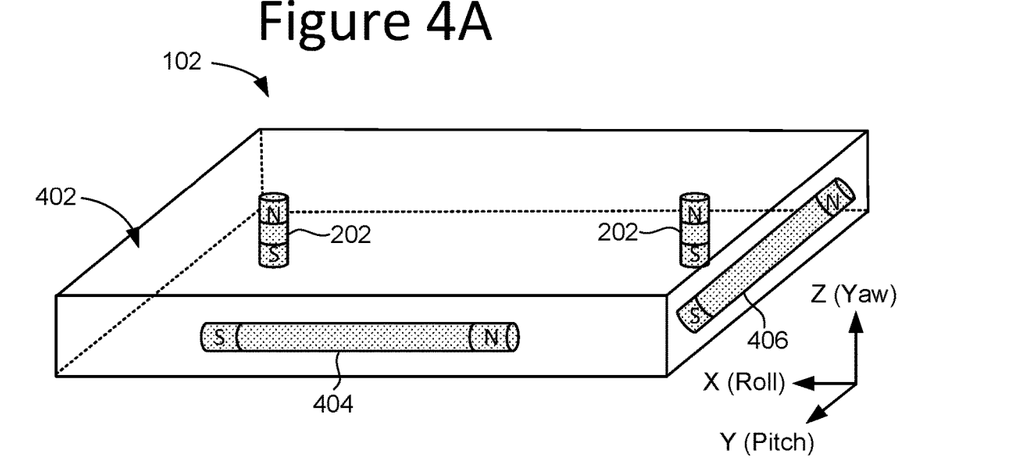
FIG. 4A is a perspective view of one embodiment of the body of a spacecraft.
Figure 4B:
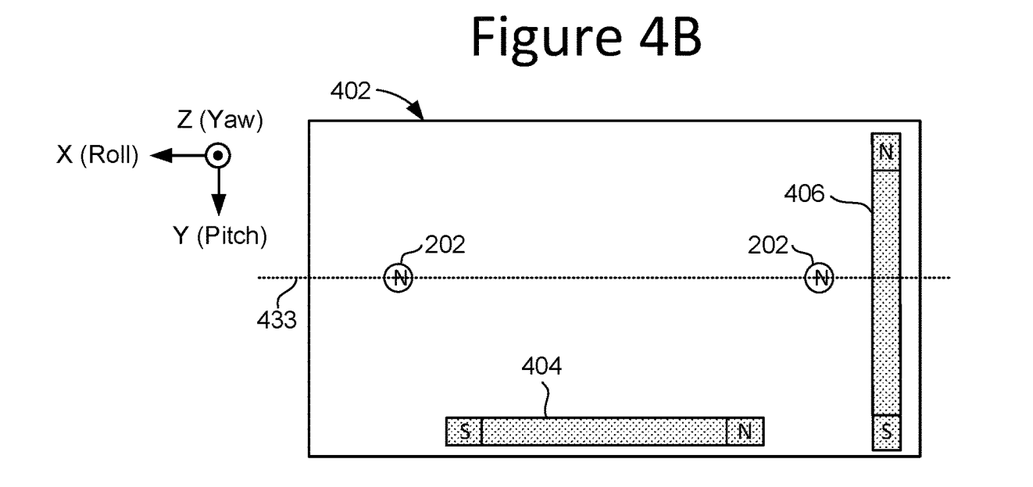
FIG. 4B is a top view of the spacecraft of FIG. 4A.
Figure 4C:
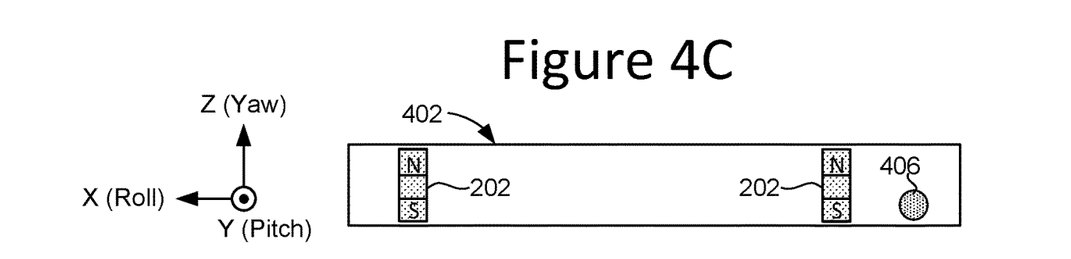
FIG. 4C is a cross-sectional view of the spacecraft of FIGS. 4A and 4B viewed along line 433 in FIG. 4B.

FIG. 4A is a perspective view of one embodiment of the body 402 of a spacecraft 102. FIG. 4B is a top view of the spacecraft 102 of FIG. 4A. FIG. 4C is a cross-sectional view of the spacecraft 102 of FIGS. 4A and 4B viewed along line 433 in FIG. 4B. The body 402 may also be referred to as a bus. The body 402 may be made of a lightweight material such as, for example, aluminum, titanium, graphite, etc. In an embodiment, the body 402 has a planar shape. By a planar shape it is meant that the length of the body in the z-direction is significantly less than the length of the body in the x-direction and the z-direction. However, the body is not required to be planar. In FIGS. 4A and 4B the body 402 is depicted as having a rectangular shape in the x-y plane. However, the body 402 is not required to have a rectangular shape in the x-y plane. For example, the body 402 could have a hexagonal shape in the x-y plane, or the shape of some other polygon. However, the body 402 is not required to be shaped as a polygon in the x-y plane. The spacecraft 102 may also have a payload such as antennas, solar panels, earth-observing equipment, remote-sensors, etc. However, the payload is not depicted in FIGS. 4A-4C.

The spacecraft 102 has a number of magnetic torque rods 202, 404, 406. Two z-axis magnetic torque rods 202 are depicted. Also depicted are an x-axis magnetic torque rod 404 and a y-axis magnetic torque rod 406. The x-axis, y-axis, and z-axis magnetic torque rods are orthogonal to each other. FIGS. 4A-4C depict an example orientation of the north magnetic pole and a south magnetic pole for each magnetic torque rod. For each magnetic torque rod 404, the magnetic polarity may be reversed. That is, the relative orientation of the north magnetic pole to south magnetic pole may be reversed.

Figure 5:
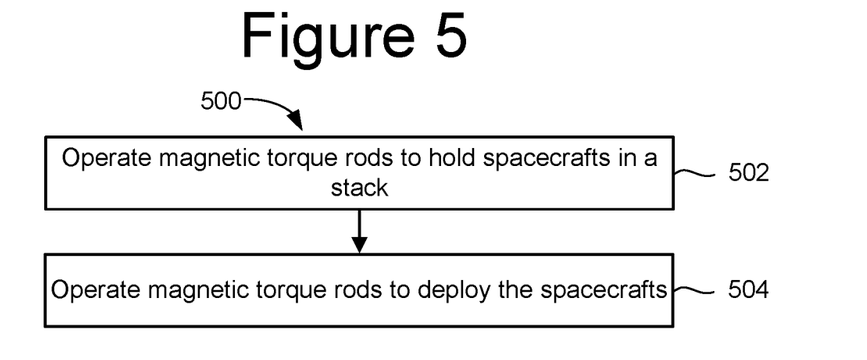
FIG. 5 is a flowchart of one embodiment of a process of deploying multiple spacecraft from a stack of spacecraft.

Techniques are disclosed herein for using z-axis magnetic torque rods 202 to deploy spacecraft, such as satellites, from a launch vehicle. FIG. 5 is a flowchart of one embodiment of a process 500 of deploying spacecraft 102 from a stack of spacecraft. The process 500 may be performed after a launch vehicle has been used to transport the stack of spacecraft to a suitable altitude. The process 500 may be controlled by one or more control circuits. In one embodiment, each spacecraft 102 has a control circuit that controls the z-axis magnetic torque rod(s) 202 of that spacecraft 102. Optionally, a control circuit that is external to the spacecraft 102, such as control circuit 222 in the primary payload adaptor 230, may be used in process 500. Optionally, a tie-down and release mechanism may be used to hold the spacecraft 102 in a stacked configuration when the launch vehicle has reached the suitable altitude and prior to process 500.

Figures 6A, 6B:
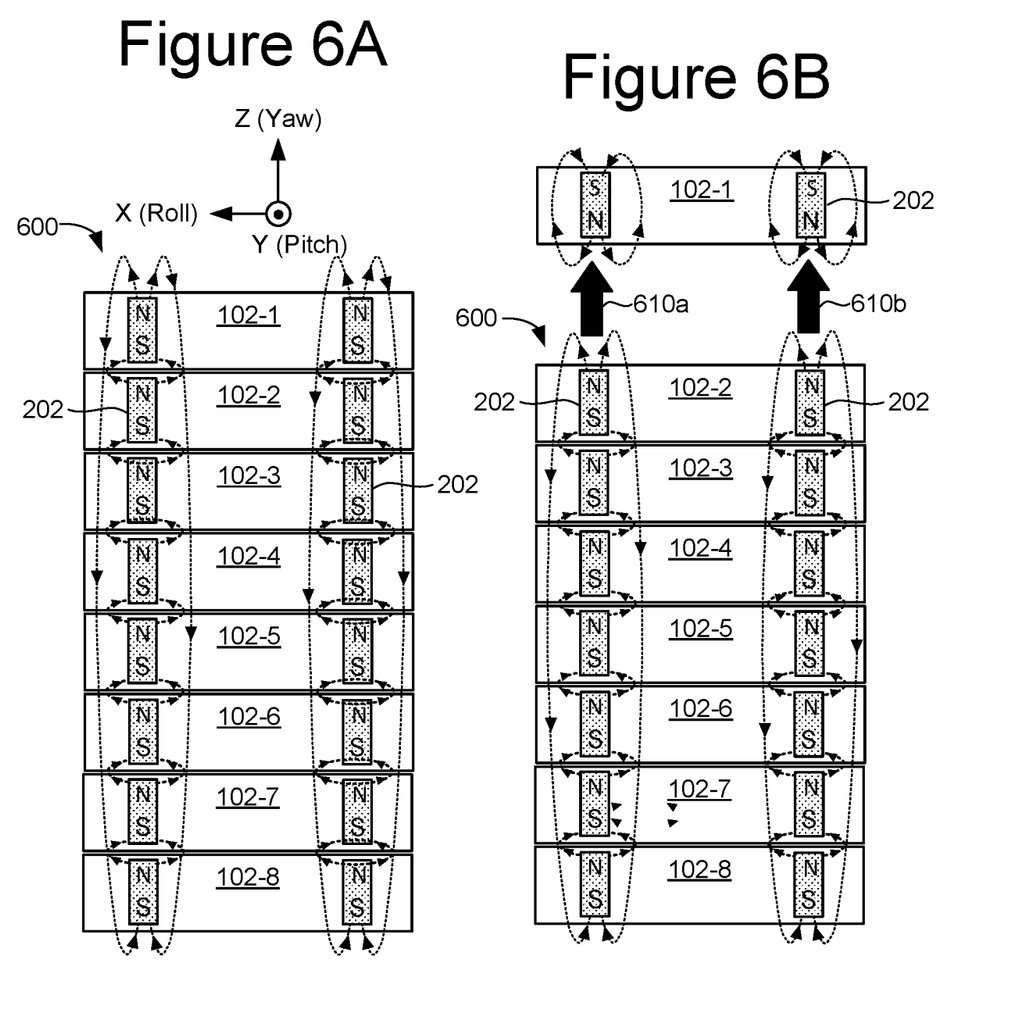
FIG. 6A depicts a stack of spacecraft in which the magnetic torque rods are operated in accordance with an embodiment to hold the spacecraft in a stack together in the clamping configuration.
FIG. 6B depicts a top spacecraft being deployed from the stack of spacecraft of FIG. 6A.

Step 502 includes operating magnetic torque rods 202 to hold spacecraft 102 in a stack together. FIG. 6A depicts a stack 600 of spacecraft 102 in which the magnetic torque rods 202 are operated to hold the spacecraft 102 in a stack together in a clamping configuration in which the north magnetic pole and the south magnetic pole of magnetic torque rods 202 in adjacent spacecraft in the stack 600 face each other. Magnetic field lines having arrow-heads in the direction from the north to south poles are depicted. FIG. 6A depicts the bodies of the spacecraft 102-1 to 102-8. The payload of each respective spacecraft 102 is not depicted. Also, elements such as thrusters are not depicted. Eight spacecraft 102-1 to 102-8 are depicted in the stack 600, but there could be more or fewer spacecraft. Each spacecraft 102 has two z-axis magnetic torque rods 202 consistent with the example in FIGS. 4A-4C; however, there may be more or fewer than two z-axis magnetic torque rods 202 per spacecraft 102. The x-axis magnetic torque rods 404 and y-axis magnetic torque rods 406 are not depicted in FIG. 6A.

Step 504 includes operating the magnetic torque rods to deploy the spacecraft 102. In one embodiment, all or at least most of the spacecraft 102 are sequentially deployed. Step 504 includes reversing the magnetic polarity of the z-axis magnetic torque rods 202 in a present top spacecraft 102-1 in the stack to repel the current top spacecraft 102-1 from the stack. With reference to FIG. 6B, the polarity of the z-axis magnetic torque rods 202 are reversed relative to FIG. 6A. In the example in FIG. 6B, the north magnetic poles of the magnetic torque rods 202 in spacecraft 102-1 face the north magnetic poles of the respective magnetic torque rods 202 in spacecraft 102-2. Therefore, the top spacecraft 102-1 is forced away from the stack 600, as indicated by arrows 610a, 610b. Due to conservation of momentum the stack 600 may also be forced away from the top spacecraft 102-1 to some extent.

Figure 7A:
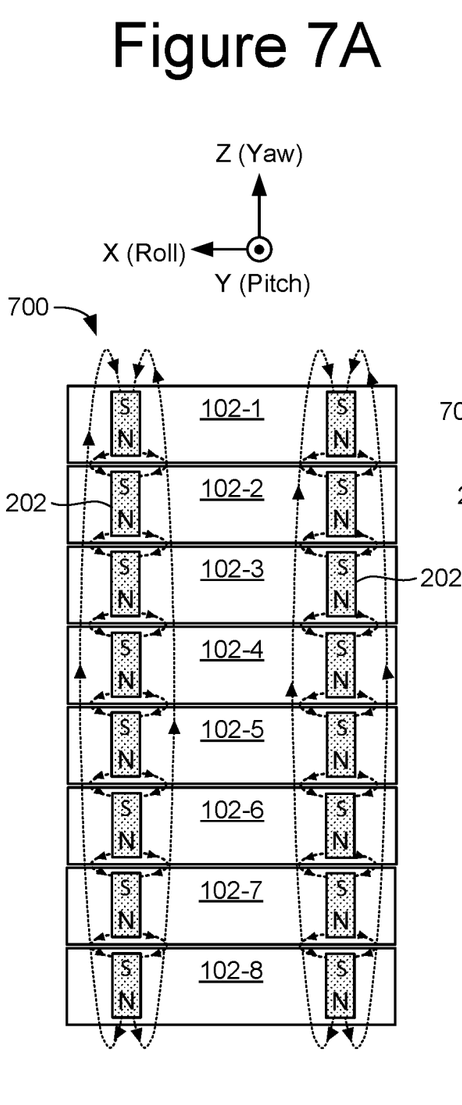
FIG. 7A depicts a stack of spacecraft in which the magnetic torque rods are operated in accordance with an embodiment that is an alternative to an embodiment of FIG. 6A to hold the spacecraft in a stack together in a clamping configuration
Figure 7B:
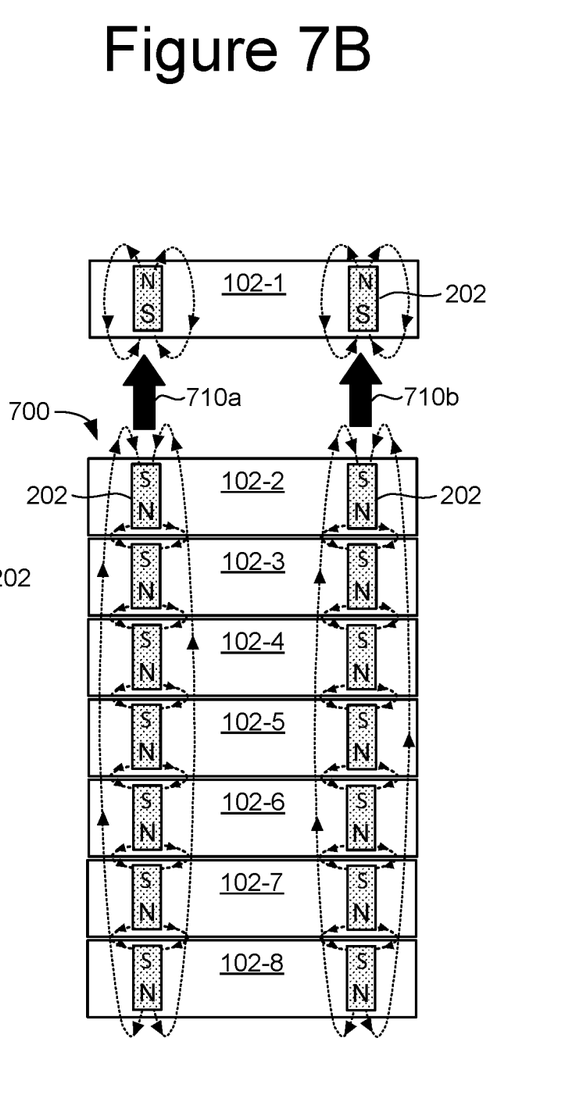
FIG. 7B depicts a top spacecraft being deployed from the stack of spacecraft of FIG. 7A.

FIGS. 7A and 7B depict an alternate embodiment to the embodiment in FIGS. 6A and 6B. In FIG. 7A the south magnetic pole of each z-axis magnetic torque rod 202 is above the north magnetic pole of that z-axis magnetic torque rod 202 (with respect to the direction of the z-axis). However, similar to FIG. 6A the magnetic torque rods 202 are operated to hold the spacecraft 102 in a stack 700 together. In the clamping configuration the north magnetic pole and the south magnetic pole of magnetic torque rods 202 in adjacent spacecraft in the stack face each other. FIG. 7B shows that the reversal of the magnetic polarity of the z-axis magnetic torque rods 202 in spacecraft 102-1. Therefore, the top spacecraft 102-1 is forced away from the stack 700, as indicated by arrows 710a, 710b. Due to conservation of momentum the stack 700 may also be forced away from the top spacecraft 102-1 to some extent.

Figure 8:
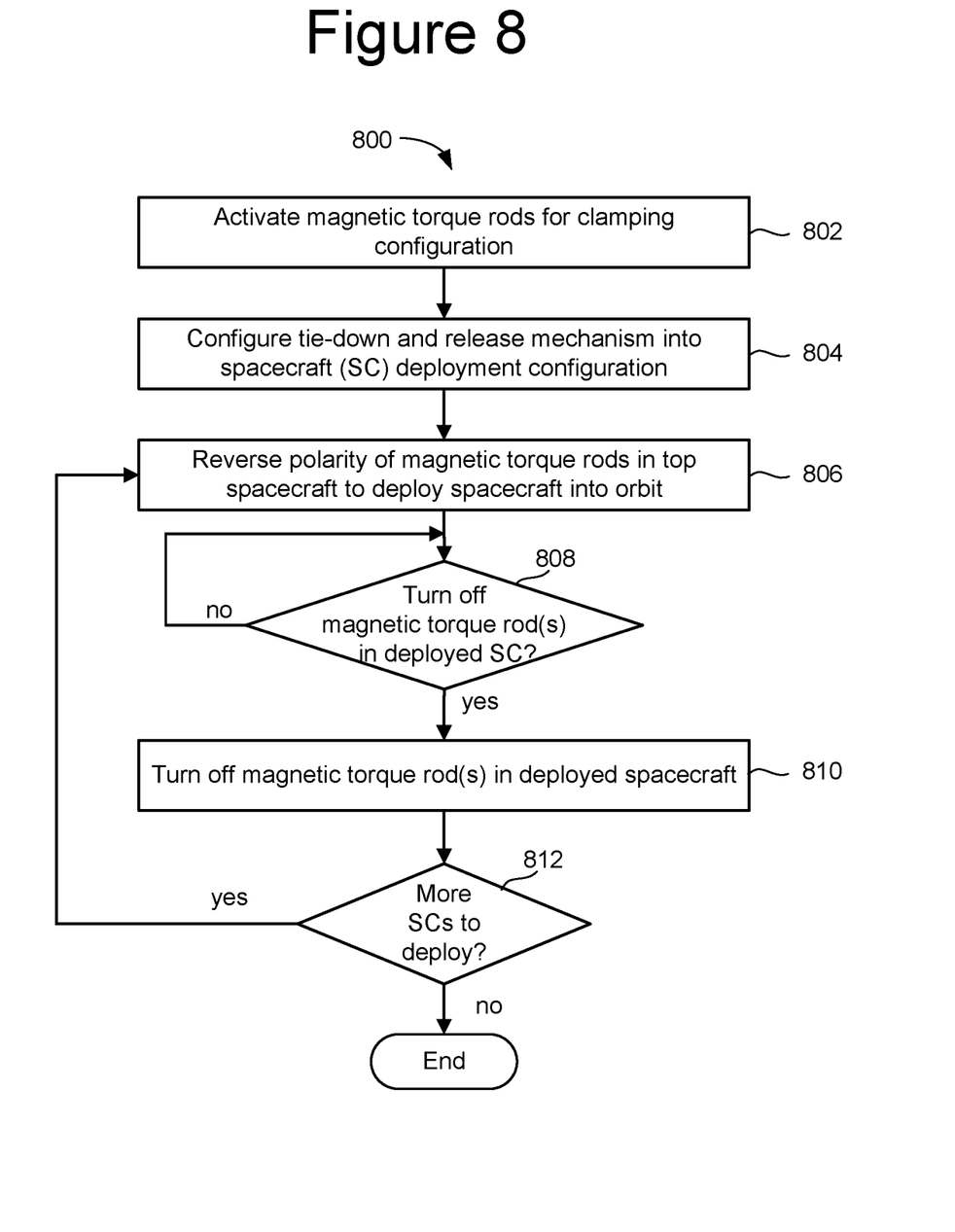
FIG. 8 is a flowchart of one embodiment of a process of deploying spacecraft from a stack of spacecraft using magnetic torque rods.

FIG. 8 is a flowchart of one embodiment of a process 800 of deploying spacecraft 102 from a stack of spacecraft using magnetic torque rods 202. The process 800 provides further details for an embodiment of process 500. Prior to process 800 a tie-down and release mechanism may be used to hold the stack of spacecraft 102 together. FIG. 2 depicts an example in which a tie-down and release mechanism is used to hold the spacecraft 102 together in a launch configuration. The tie-down and release mechanism may be used in a similar manner just before process 800 after the launch vehicle has reached a suitable altitude.

Figure 9A:
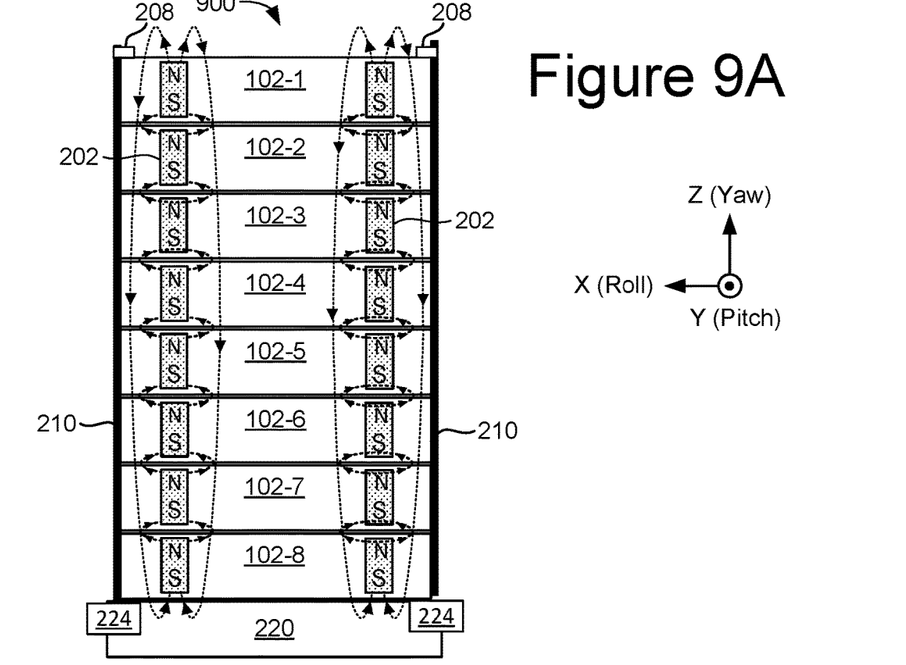
FIG. 9A depicts an embodiment of a clamping configuration of step 802 of the process of FIG. 8.

Step 802 includes activating z-axis magnetic torque rods 202 for a clamping configuration. In the clamping configuration the north magnetic pole and the south magnetic pole of magnetic torque rods 202 in adjacent spacecraft 102 in the stack face each other. FIG. 9A depicts an example of a stack 900 of spacecraft in the clamping configuration. The tension rods 210 are still in a launch configuration in which the spacecraft 102-1 to 102-8 are held together in a stack 900 with one spacecraft 102 above another along the z-axis. In one embodiment, the z-axis of the stack 900 is aligned with the Earth's magnetic field prior to activating the z-axis magnetic torque rods 202, which may provide a more stable environment for spacecraft deployment. Depending on factors such as the strength of the Earth's magnetic field and the total time to deploy the spacecraft if the stack 900 is not pre-aligned with the Earth's magnetic field, then it is possible that the stack 900 may align itself to the Earth's magnetic field during deployment. Note, however, that it is not required that spacecraft deployment be performed in the presence of a significant Earth magnetic field. For example, spacecraft deployment using z-axis magnetic torque rods 202 could be performed in low earth orbits (e.g., LEO) or at higher earth orbits (e.g., GEO).

Figure 9B:
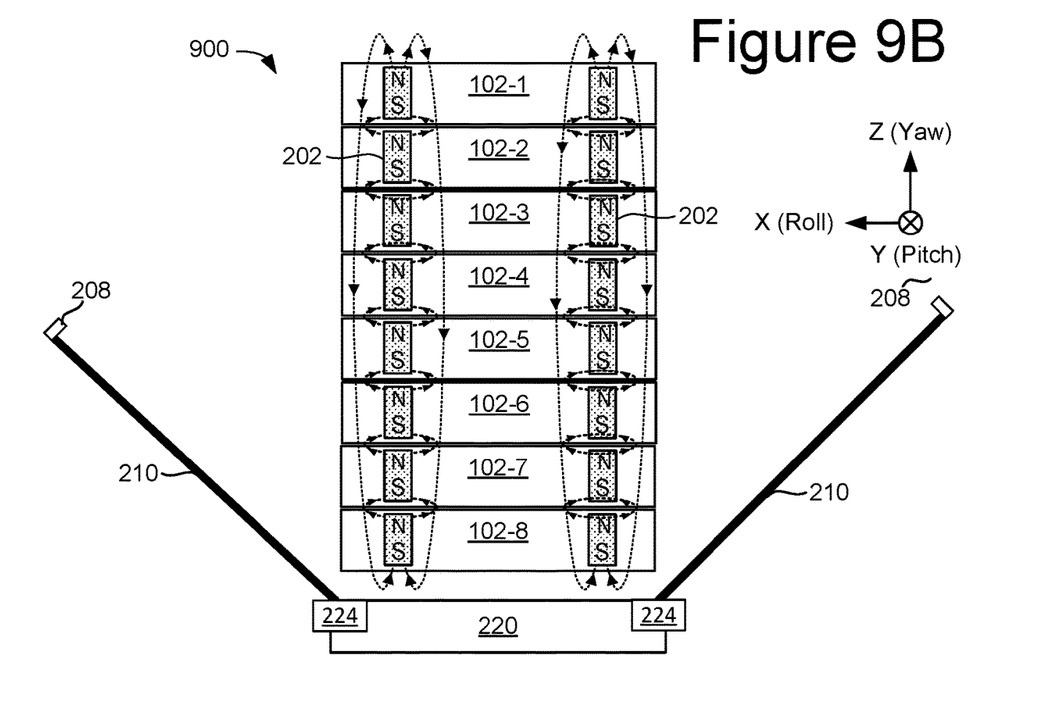
FIG. 9B depicts an example of the tension rods being moved away from the sides of the stack of spacecraft to allow the spacecraft to be deployed.

Step 804 includes configuring the tie-down and release mechanism into a spacecraft deployment configuration. In the spacecraft deployment configuration tension rods 210 may be moved away from the stack of spacecraft 102 to allow deployment of spacecraft 102. FIG. 9B depicts an example of the tension rods 210 moved away from the sides of the stack 900 to allow the spacecraft 102 to be deployed. The tension rods 210 no longer hold the stack of spacecraft together. However, the z-axis magnetic torque rods 202 will hold the spacecraft 102 together in the stack 900. A variety of techniques may be used to move the tension rods 210 into the deployment configuration. Moreover, the stack 900 may separate from the launch vehicle. FIG. 9B depicts a separation between the stack 900 and the launch adaptor 220. In an embodiment, control circuit 222 in the primary payload adaptor 230 performs step 804.

Step 806 includes reversing the polarity of the z-axis magnetic torque rods 202 in the current top spacecraft 102 in the stack to deploy the top spacecraft 102 into orbit. This step is depicted in FIG. 6B (as well as FIG. 7B). Step 808 is a determination of whether to turn off (de-activate) the z-axis magnetic torque rods 202 in the spacecraft that has just been deployed. In one embodiment, the z-axis axis magnetic torque rods 202 are turned off a pre-determined time after reversing the polarity in step 806. Step 810 includes turning off the z-axis magnetic torque rods 202 in the spacecraft that has just been deployed. Under some conditions turning off the z-axis magnetic torque rods 202 may prevent the spacecraft from flipping over to align itself with the Earth's magnetic field. In an embodiment, steps 806, 808, and 810 are performed by a control circuit within the spacecraft having the z-axis axis magnetic torque rod(s) 202 for which the state is changed.

Step 812 is a determination of whether there are more spacecraft 102 to deploy. If so, steps 806-810 are repeated for the spacecraft that is now at the top of the stack. In one embodiment, the control circuit within each spacecraft is programmed to know where that spacecraft is in the sequence such that that control circuit knows when to perform steps 806-810. Optionally, a control circuit external to the spacecraft 102 may instruct the control circuit within the spacecraft when to perform steps 806-810. In one embodiment, the last iteration will deploy the last two spacecraft that remain in the stack. In other words, for the last iteration of steps 806-810 the final two spacecraft will push off from each other upon reversal of the magnitude polarity of the z-axis magnetic torque rods 202 of one of the two remaining spacecraft.

Note that after process 800 optionally additional actions may be performed to place the spacecraft 102 into their respective final orbits. For example, thrusters on the spacecraft 102 may be used after process 800 to place the spacecraft 102 into their respective final orbits.

Figure 10A:
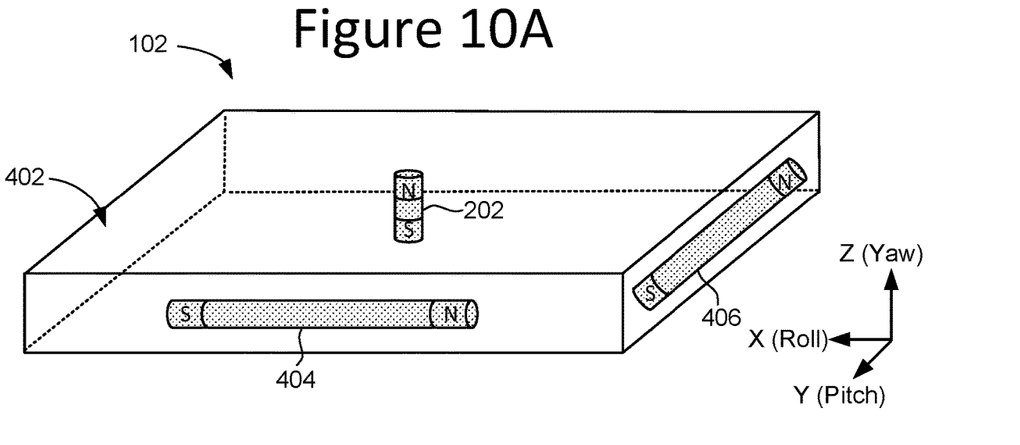
FIGS. 10A, 10B, and 10C depict an embodiment in which each spacecraft has a single z-axis magnetic torque rod that is used to deploy multiple spacecraft.
Figure 10B:
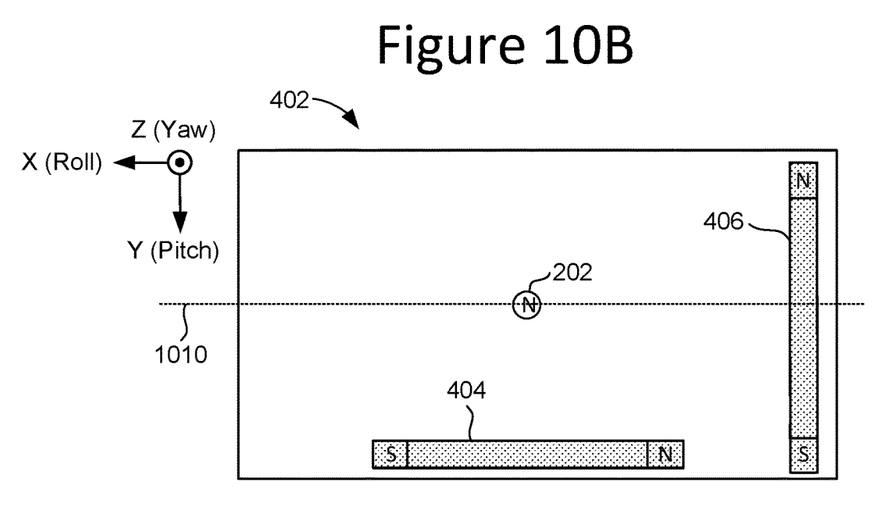
Figure 10C:
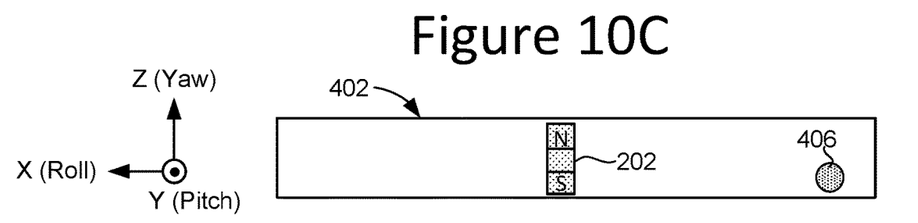

Although some embodiments described herein use two z-axis magnetic torque rods 202 in each spacecraft 102 for deployment, more or fewer z-axis magnetic torque rods 202 may be used to deploy spacecraft. FIGS. 10A-10C depict an embodiment in which each spacecraft 102 has a single z-axis magnetic torque rod 202 that is used for to deploy spacecraft 102. FIG. 10A shows a perspective view of a spacecraft 102 having a single z-axis magnetic torque rod 202. FIG. 10B shows a top view of the spacecraft 102 of FIG. 10A. FIG. 10C shows a side view of the spacecraft along line 1010 of FIG. 10B. In an embodiment, the z-axis magnetic torque rod 202 is located near a center of mass of the spacecraft 102.

Figure 11A:
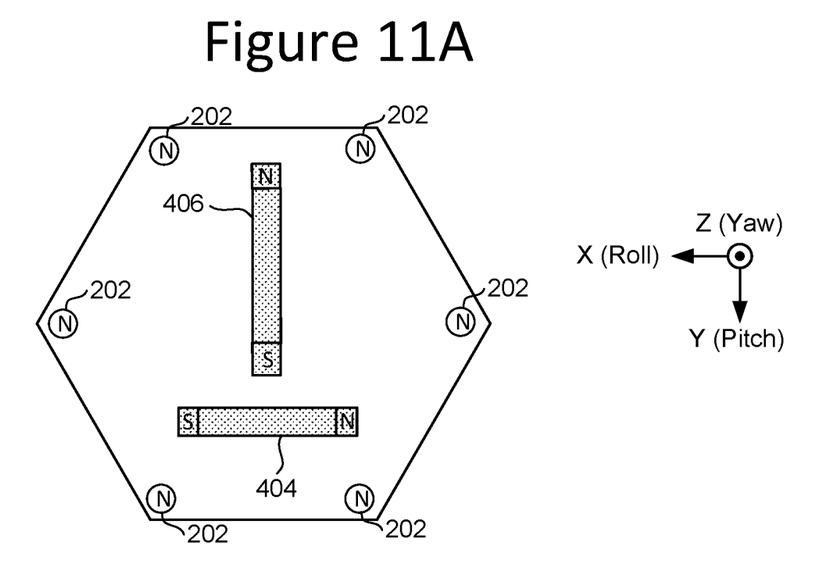
FIG. 11A depicts a top view of an embodiment of a spacecraft having six z-axis magnetic torque rods that may be used for spacecraft deployment.

FIG. 11A depicts a top view of an embodiment of a spacecraft 102 having six z-axis magnetic torque rods 202 that may be used for spacecraft deployment. The spacecraft 102 has a hexagonal shape in the x-y plane. The spacecraft 102 may be a planar spacecraft. In an embodiment, the spacecraft 102 in the stack are similar in shape but are rotated 60 degrees in the x-y plane relative to the spacecraft 102 directly below/above it. However, due to the use of six z-axis magnetic torque rods 202, the magnetic axes of each set of magnetic torque rods 202 will align with each other along the z-axis. Note also that when the spacecraft 102 have other numbers of z-axis magnetic torque rods 202 that each spacecraft 102 in the stack may be rotated a certain number of degrees in the x-y plane relative to the spacecraft 102 directly below it. For example, in an embodiment in which each spacecraft has two z-axis magnetic torque rods 202 each spacecraft 102 may be rotated 180 degrees in the x-y plane relative to the spacecraft 102 directly below it. More generally, in one embodiment, the spacecraft 102 are rotated 360/N degrees in the x-y plane from an adjacent spacecraft when in the stacked configuration, wherein N is an integer greater than 1. Furthermore, each spacecraft 102 has N z-axis magnetic torque rods. Therefore, collectively the N z-axis magnetic torque rods 202 of the spacecraft 102 form a corresponding N sets of z-axis magnetic torque rods when in the stacked configuration.

Figure 11B:
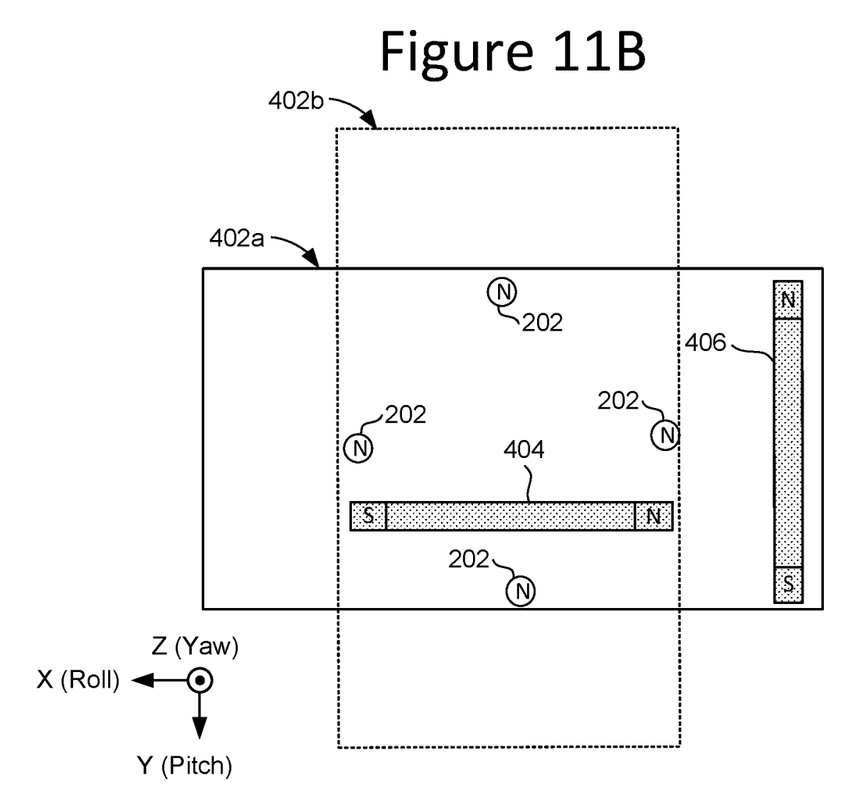
FIG. 11B depicts a top view of an embodiment of a spacecraft having four z-axis magnetic torque rods that may be used for spacecraft deployment.

FIG. 11B depicts a top view of an embodiment of a spacecraft 102 having four z-axis magnetic torque rods 202 that may be used for spacecraft deployment. The spacecraft 102 has a rectangular shape in the x-y plane. The spacecraft 102 may be a planar spacecraft. In an embodiment, the spacecraft 102 in the stack are similar in shape but are rotated 90 degrees in the x-y plane relative to the spacecraft 102 directly below/above it. However, due to the location of the four z-axis magnetic torque rods 202, the magnetic axes of each set will align with each other along the z-axis. FIG. 11B shows spacecraft 402a which is at one level of the stack and a dashed rectangle to represent a spacecraft 402b that may be at one level higher or one level lower in the stack. The four z-axis magnetic torque rods 202 of spacecraft 402b are not depicted in FIG. 11B, but those four z-axis magnetic torque rods 202 will align along the z-axis in the corresponding four z-axis magnetic torque rods 202 of those of spacecraft 402a.

Figure 12:
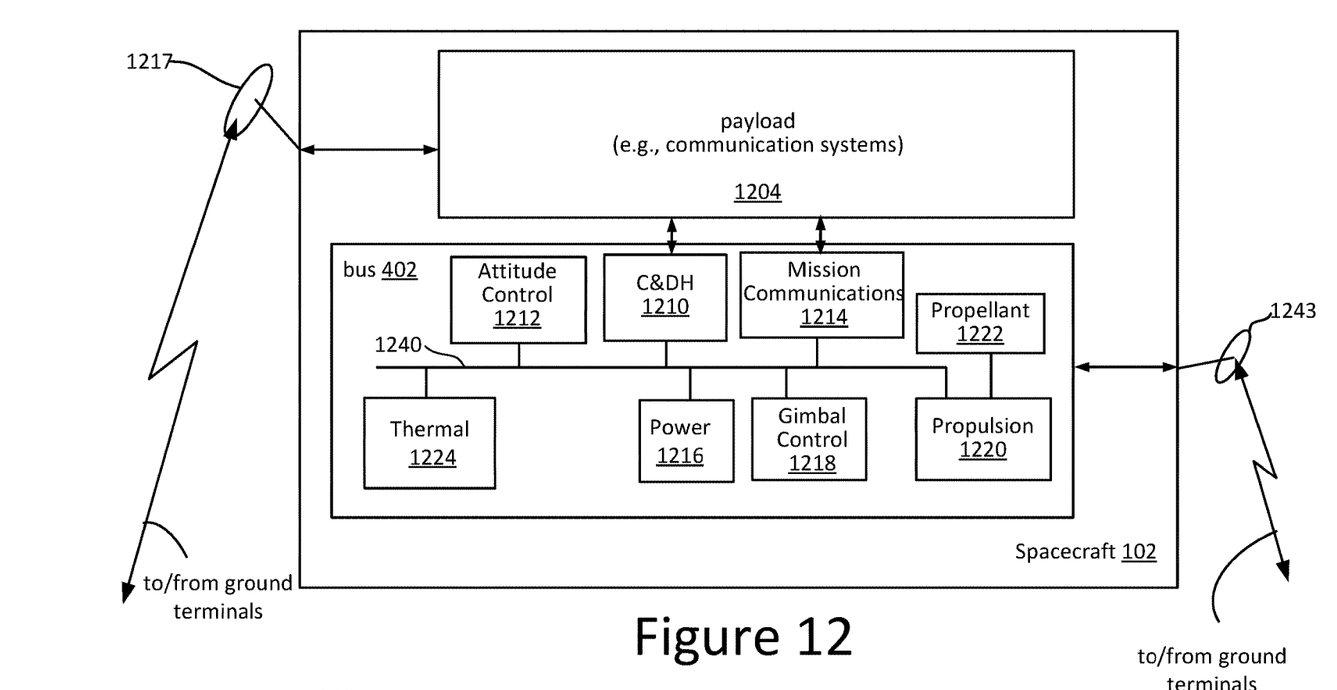
FIG. 12 is a block diagram of an example spacecraft.

FIG. 12 is a block diagram of one embodiment of spacecraft 102, which in one example (as discussed above) is a satellite. In one embodiment, spacecraft 102 includes a bus 402 and a payload 1204 carried by bus 402. Some embodiments of spacecraft 102 may include more than one payload. The payload provides the functionality of communication, sensors and/or processing systems needed for the mission of spacecraft 102.

In general, bus 402 is the spacecraft that houses and carries the payload 1204, such as the components for operation as a communication satellite. The bus 402 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 1210, attitude control systems 1212, mission communication systems 1214, power subsystems 1216, gimbal control electronics 1218 that be taken to include a solar array drive assembly, a propulsion system 1220 (e.g., thrusters), propellant 1222 to fuel some embodiments of propulsion system 1220, and thermal control subsystem 1224, all of which are connected by an internal communication network 1240, which can be an electrical bus (a "flight harness") or other means for electronic, optical or RF communication when spacecraft is in operation. Also represented are an antenna 1243, that is one of one or more antennae used by the mission communication systems 1214 for exchanging communications for operating of the spacecraft with ground terminals, and a payload antenna 1217, that is one of one or more antennae used by the payload 1204 for exchanging communications with ground terminals, such as the antennae used by a communication satellite embodiment. Other equipment can also be included.

The command and data handling module 1210 includes any processing unit or units for handling includes command control functions for spacecraft 102, such as for attitude control functionality and orbit control functionality. The attitude control systems 1212 can include devices including torque rods, reaction wheel drive electronics, and/or control momentum gyro control electronics, for example, that are used to monitor and control the attitude of the spacecraft. The torque rods may include an x-axis magnetic torque rod 404, a y-axis magnetic torque rod 406, and one or more z-axis magnetic torque rods 202. As described herein the more z-axis magnetic torque rods 202 can be used during deployment of spacecraft 102 into orbit.

Mission communication systems 1214 includes wireless communication and processing equipment for receiving telemetry data/commands, other commands from the ground control terminal 30 to the spacecraft and ranging to operate the spacecraft. Processing capability within the command and data handling module 1210 is used to control and operate spacecraft 102. An operator on the ground can control spacecraft 102 by sending commands via ground control terminal 30 to mission communication systems 1214 to be executed by processors within command and data handling module 1210. In one embodiment, command and data handling module 1210 and mission communication system 1214 are in communication with payload 1204. In some example implementations, bus 402 includes one or more antennae as indicated at 1243 connected to mission communication system 1214 for wirelessly communicating between ground control terminal 30 and mission communication system 1214. Power subsystems 1216 can include one or more solar panels and charge storage (e.g., one or more batteries) used to provide power to spacecraft 102. Propulsion system 1220 (e.g., thrusters) is used for changing the position or orientation of spacecraft 102 while in space to move into orbit, to change orbit or to move to a different location in space. The gimbal control electronics 1218 can be used to move and align the antennae, solar panels, and other external extensions of the spacecraft 102.

In one embodiment, the payload 1204 is for a communication satellite and includes an antenna system (represented by the antenna 1217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 1214 acts as an interface that uses the antennae of payload 1204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

Figure 13:
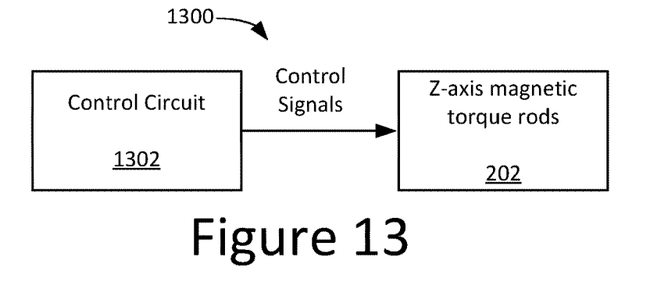
FIG. 13 depicts a block diagram of an embodiment of a system for controlling deployment of multiple spacecraft using z-axis magnetic torque rods.

FIG. 13 depicts a block diagram of an embodiment of a system for controlling deployment of spacecraft 102 using z-axis magnetic torque rods 202. The system 1300 may be used to perform process 500 and/or 800. The control circuit 1302 sends control signals to the z-axis magnetic torque rods 202 to activate or de-activate the respective z-axis magnetic torque rods 202, as well as to control the relative orientation of the north and south magnetic poles. Therefore, the control circuit 1302 may oversee spacecraft deployment into orbit as described herein. In one embodiment, the control circuit 1302 may reside in C&DH 1210. The control circuit 1302 may receive commands from a control circuit external to the spacecraft, such as control circuit 222 in the primary payload adaptor 230 (see FIG. 2). The control circuit 1302 may comprise hardware and/or software. The control circuit 1302 could include one or more of a processor (e.g., microprocessor), PGA (Programmable Gate Array, FPGA (Field Programmable Gate Array), ASIC (Application Specific Integrated Circuit), integrated circuit or other type of circuit. The term one or more circuits may be used herein to refer to any combination of, but is not limited to, the control circuit 1302 of the spacecraft being deployed and/or control circuit 222. Collectively the one or more control circuits 1302 of the respective spacecraft being deployed and or a control circuit external to the spacecraft may be referred to herein as a spacecraft deployment controller or as a satellite deployment controller.

A first embodiment includes a system comprising a plurality of spacecraft. When in a stacked configuration the plurality of spacecraft are stacked above each other along a z-axis. Each spacecraft comprises one or more z-axis magnetic torque rods oriented along the z-axis. Collectively the one or more z-axis magnetic torque rods form a corresponding one or more sets of z-axis magnetic torque rods in which magnetic axes of the magnetic torque rods in each respective set are aligned with each other along the z-axis when the plurality of spacecraft are in the stacked configuration. The system also comprises one or more circuits in communication with the z-axis magnetic torque rods of the plurality of spacecraft. The one or more circuits are configured to operate each set of z-axis magnetic torque rods in a clamping configuration to maintain the plurality of spacecraft in the stacked configuration. In the clamping configuration a north magnetic pole and a south magnetic pole of the z-axis magnetic torque rods in adjacent spacecraft in the stack face each other. The one or more circuits are configured to operate the z-axis magnetic torque rods to deploy the plurality of spacecraft, including reverse a magnetic polarity of the one or more z-axis magnetic torque rods in a current top spacecraft in the stack to repel the current top spacecraft from the stack.

In a second embodiment, in furtherance of the first embodiment, the system further comprises a tie-down and release mechanism having a first configuration to hold the plurality of spacecraft in the stacked configuration prior to deployment of the spacecraft while the stack of z-axis magnetic torque rods are inactive. The one or more circuits are further configured to activate the z-axis magnetic torque rods to operate each set of z-axis magnetic torque rods in the clamping configuration while the tie-down and release mechanism is in the first configuration.

In a third embodiment, in furtherance of the second embodiment, the one or more circuits are further configured to move the tie down and release mechanism to a deployment configuration while the one or more sets of z-axis magnetic torque rods are in the clamping configuration, wherein the one or more sets of magnetic torque rods maintain the plurality of spacecraft in the stacked configuration.

In a fourth embodiment, in furtherance of any of the first to third embodiments, the one or more circuits are further configured to de-activate the one or more z-axis magnetic torque rods of the current top spacecraft after the current top spacecraft has been deployed from the stack.

In a fifth embodiment, in furtherance of any of the first to fourth embodiments, each spacecraft comprises two z-axis magnetic torque rods. Collectively the two z-axis magnetic torque rods of the plurality of spacecraft form a corresponding two sets of z-axis magnetic torque rods.

In a sixth embodiment, in furtherance of any of the first to fifth embodiments, the plurality of spacecraft are rotated 360/N degrees in an x-y plane from an adjacent spacecraft when in the stacked configuration, wherein N is an integer greater than 1. Each spacecraft has N z-axis magnetic torque rods. Collectively the N z-axis magnetic torque rods of the plurality of spacecraft are arranged to form a corresponding N sets of z-axis magnetic torque rods when in the stacked configuration.

In a seventh embodiment, in furtherance of any of the first to sixth embodiments, the one or more circuits are configured to deploy the plurality of spacecraft into a low earth orbit (LEO).

In an eighth embodiment, in furtherance of any of the first to seventh embodiments, each spacecraft has a body having a planar shape. The one or more z-axis magnetic torque rods of a respective spacecraft are fixed to the body of the respective spacecraft.

One embodiment includes a method for deploying spacecraft from a stack of spacecraft. The method comprises activating z-axis magnetic torque rods in the stack of spacecraft to maintain the spacecraft in a pre-deployment configuration. Each spacecraft comprises one or more z-axis magnetic torque rods oriented along the z-axis. Each z-axis magnetic torque rod in a spacecraft is part of a set of z-axis magnetic torque rods in which magnetic axes of the magnetic torque rods in the set are aligned with each other along the z-axis when the spacecraft are in the pre-deployment configuration. A north magnetic pole and a south magnetic pole of z-axis magnetic torque rods in adjacent spacecraft in the stack face each other in the pre-deployment configuration. The method comprises operating the z-axis magnetic torque rods to sequentially deploy the spacecraft from the stack, including reversing a magnetic polarity of the one or more z-axis magnetic torque rods in a current top spacecraft in the stack to repel the current top spacecraft from the stack.

One embodiment includes satellite deployment system. The satellite deployment system comprises a launch vehicle adaptor configured to connect to a launch vehicle. A plurality of satellites in a stacked configuration when in a launch configuration, wherein each satellite comprises one or more z-axis magnetic torque rods oriented along a z-axis. Collectively the one or more z-axis magnetic torque rods form a corresponding one or more sets of z-axis magnetic torque rods in which magnetic axes of the magnetic torque rods in each respective set are aligned with each other along the z-axis when the plurality of satellites are in the stacked configuration. The satellite deployment system comprises a tie-down and release mechanism configured to hold the plurality of satellites to the launch vehicle adaptor in the stacked configuration when in the launch configuration. The tie-down and release mechanism has a deployment configuration to allow the plurality of satellites to be deployed from the launch vehicle. The satellite deployment system comprises a satellite deployment controller configured to deploy the plurality of satellite sequentially into orbit from the launch vehicle. The satellite deployment controller is configured to operate each set of z-axis magnetic torque rods such that north poles and south poles of the z-axis magnetic torque rods face each other at a time when the tie-down and release mechanism is in the launch configuration. The satellite deployment controller is configured to re-configure the tie-down and release mechanism to the deployment configuration while the north poles and the south poles of the magnetic torque rods face each other, wherein the one or more sets of magnetic torque rods maintain the plurality of satellite in the stacked configuration. The satellite deployment controller is configured to, for a sequence of top satellites in the stacked configuration, reverse a magnetic polarity of the one or more z-axis magnetic torque rods in a current top satellite in the stacked configuration to deploy the current top satellite from the stacked configuration.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A system comprising:
a plurality of spacecraft, wherein when in a stacked configuration the plurality of spacecraft are stacked above each other along a z-axis, wherein each spacecraft comprises one or more z-axis magnetic torque rods oriented along the z-axis, wherein collectively the one or more z-axis magnetic torque rods form a corresponding one or more sets of z-axis magnetic torque rods in which magnetic axes of the magnetic torque rods in each respective set are aligned with each other along the z-axis when the plurality of spacecraft are in the stacked configuration, wherein the one or more z-axis magnetic torque rods of a particular spacecraft is configured to interact with the Earth's magnetic field to provide torque to control orientation of the particular spacecraft; and
one or more circuits in communication with the z-axis magnetic torque rods of the plurality of spacecraft, wherein the one or more circuits are configured to:
operate each set of z-axis magnetic torque rods in a clamping configuration to maintain the plurality of spacecraft in the stacked configuration, wherein in the clamping configuration a north magnetic pole and a south magnetic pole of the z-axis magnetic torque rods in adjacent spacecraft in the stack face each other; and
operate the z-axis magnetic torque rods to deploy the plurality of spacecraft, including reverse a magnetic polarity of the one or more z-axis magnetic torque rods in a current top spacecraft in the stack to repel the current top spacecraft from the stack.

2. The system of claim 1, wherein:
the system further comprises a tie-down and release mechanism having a first configuration to hold the plurality of spacecraft in the stacked configuration prior to deployment of the spacecraft while the stack of z-axis magnetic torque rods are inactive; and
the one or more circuits are further configured to activate the z-axis magnetic torque rods to operate each set of z-axis magnetic torque rods in the clamping configuration while the tie-down and release mechanism is in the first configuration.

3. The system of claim 2, wherein the one or more circuits are further configured to:
move the tie-down and release mechanism to a deployment configuration while the one or more sets of z-axis magnetic torque rods are in the clamping configuration, wherein the one or more sets of magnetic torque rods maintain the plurality of spacecraft in the stacked configuration.

4. The system of claim 1, wherein the one or more circuits are further configured to:

de-activate the one or more z-axis magnetic torque rods of the current top spacecraft after the current top spacecraft has been deployed from the stack.

5. The system of claim 1, wherein:
each spacecraft comprises two z-axis magnetic torque rods; and
collectively the two z-axis magnetic torque rods of the plurality of spacecraft form a corresponding two sets of z-axis magnetic torque rods.

6. The system of claim 1, wherein:
each spacecraft in the plurality of spacecraft is rotated 360/N degrees in an x-y plane from an adjacent spacecraft when in the stacked configuration, wherein N is an integer greater than 1;
each spacecraft has N z-axis magnetic torque rods; and
collectively the N z-axis magnetic torque rods of the plurality of spacecraft are arranged to form a corresponding N sets of z-axis magnetic torque rods when in the stacked configuration.

7. The system of claim 1, wherein the one or more circuits are configured to deploy the plurality of spacecraft into a low earth orbit (LEO).

8. The system of claim 1, wherein:
each spacecraft has a body having a planar shape; and
the one or more z-axis magnetic torque rods of a respective spacecraft are fixed to the body of the respective spacecraft.

9. A method for deploying spacecraft from a stack of spacecraft, the method comprising:
aligning a z-axis of the stack of spacecraft with the Earth's magnetic field;
activating z-axis magnetic torque rods in the stack of spacecraft to maintain the spacecraft in a pre-deployment configuration after aligning the z-axis of the stack of spacecraft with the Earth's magnetic field, wherein each spacecraft comprises one or more z-axis magnetic torque rods oriented along the z-axis, wherein each z-axis magnetic torque rod in a spacecraft is part of a set of z-axis magnetic torque rods in which magnetic axes of the magnetic torque rods in the set are aligned with each other along the z-axis when the spacecraft are in the pre-deployment configuration, wherein a north magnetic pole and a south magnetic pole of z-axis magnetic torque rods in adjacent spacecraft in the stack face each other in the pre-deployment configuration; and
operating the z-axis magnetic torque rods to sequentially deploy the spacecraft from the stack, including reversing a magnetic polarity of the one or more z-axis magnetic torque rods in a current top spacecraft in the stack to repel the current top spacecraft from the stack.

10. The method of claim 9, wherein activating the z-axis magnetic torque rods in the stack of spacecraft to maintain the spacecraft in a pre-deployment configuration is performed while a tie-down and release mechanism is in a launch configuration in which the tie-down and release mechanism holds the stack of spacecraft together.

11. The method of claim 10, further comprising:
configuring the tie-down and release mechanism from the launch configuration to a deployment configuration while the z-axis magnetic torque rods maintain the spacecraft in the pre-deployment configuration.

12. The method of claim 11, wherein operating the z-axis magnetic torque rods to sequentially deploy the spacecraft is performed after configuring the tie-down and release mechanism to the deployment configuration.

13. The method of claim 11, further comprising:
de-activating the one or more z-axis magnetic torque rods of the spacecraft a pre-determined time after the spacecraft has been deployed from the stack.

14. The method of claim 11, wherein operating the z-axis magnetic torque rods to sequentially deploy the spacecraft from the stack comprises deploying the spacecraft into low earth orbit (LEO).

15. A system, the system comprising:
a launch vehicle adaptor configured to connect to a launch vehicle;
a plurality of satellites in a stacked configuration when in a launch configuration, wherein each satellite comprises one or more z-axis magnetic torque rods oriented along a z-axis, wherein collectively the one or more z-axis magnetic torque rods form a corresponding one or more sets of z-axis magnetic torque rods in which magnetic axes of the magnetic torque rods in each respective set are aligned with each other along the z-axis when the plurality of satellites are in the stacked configuration;
a tie-down and release mechanism configured to hold the plurality of satellite to the launch vehicle adaptor in the stacked configuration when in the launch configuration, the tie-down and release mechanism having a deployment configuration to allow the plurality of satellites to be deployed from the launch vehicle; and
one or more controllers configured to deploy the plurality of satellites sequentially into orbit from the launch vehicle, wherein the one or more controllers configured to:
operate each set of z-axis magnetic torque rods such that north poles and south poles of the z-axis magnetic torque rods face each other at a time when the tie-down and release mechanism is in the launch configuration;
re-configure the tie-down and release mechanism to the deployment configuration while the north poles and the south poles of the magnetic torque rods face each other, wherein the one or more sets of magnetic torque rods maintain the plurality of satellite in the stacked configuration;
for a sequence of top satellites in the stacked configuration, reverse a magnetic polarity of the one or more z-axis magnetic torque rods in a current top satellite in the stacked configuration to deploy the current top satellite from the stacked configuration; and
operate the one or more z-axis magnetic torque rods of each respective satellite after deployment for attitude control of the respective satellite.

16. The system of claim 15, wherein the one or more controllers are further configured to:
de-activate the one or more z-axis magnetic torque rods of the current top satellite a pre-determined time after the current top satellite has been deployed from the stack.

17. The system of claim 15, wherein:
each satellite in the plurality of satellites is rotated 360/N degrees in an x-y plane from an adjacent satellite when in the stacked configuration, wherein N is an integer greater than 1;
each satellite has N z-axis magnetic torque rods; and
collectively the N z-axis magnetic torque rods of the plurality of satellites arranged to form a corresponding N sets of z-axis magnetic torque rods.

18. The system of claim 15, wherein each of the satellites has a body having a planar shape.

19. The system of claim 15, wherein the one or more controllers are configured to deploy the plurality of satellites into a low earth orbit (LEO).

20. The system of claim 15, wherein:
    each satellite has a single z-axis magnetic torque rod; and
    collectively the single z-axis magnetic torque rod of each of the plurality of satellites form a corresponding single set of z-axis magnetic torque rods.

\* \* \* \* \*